US005490215A

United States Patent [19]
Pelegris

[11] Patent Number: 5,490,215
[45] Date of Patent: Feb. 6, 1996

[54] TELECOMMUNICATIONS T1 CARRIER OVERVOLTAGE AND FIBER TO CURB POWER PROTECTOR

[75] Inventor: Dimitris J. Pelegris, Mount Prospect, Ill.

[73] Assignee: Oneac Corporation, Libertyville, Ill.

[21] Appl. No.: 241,868

[22] Filed: May 12, 1994

[51] Int. Cl.⁶ .................................................. H02H 9/04
[52] U.S. Cl. ........................ 379/412; 379/377; 361/119; 361/110
[58] Field of Search .................................... 379/412, 377; 361/119, 56, 67, 110

[56] References Cited

U.S. PATENT DOCUMENTS

| | | | |
|---|---|---|---|
| 3,941,940 | 3/1976 | Ahmed. | |
| 4,377,832 | 3/1983 | Toney et al. | 361/56 |
| 4,634,814 | 1/1987 | Pommer, II | 379/377 |
| 4,644,437 | 2/1987 | Robe | 361/56 |
| 4,649,457 | 3/1987 | Talbot et al. | 361/127 |
| 4,698,721 | 10/1987 | Warren | 361/110 |
| 4,709,415 | 11/1987 | Prisco | 455/612 |
| 4,743,999 | 5/1988 | Hames | 361/56 |
| 4,758,920 | 7/1988 | McCartney | 361/119 |
| 4,876,620 | 10/1989 | Borkowicz | 361/56 |
| 4,912,589 | 3/1990 | Stolarczyk | 361/56 |
| 4,941,063 | 7/1990 | McCartney et al. | 361/119 |
| 4,947,426 | 8/1990 | Montano | 379/412 |
| 4,991,051 | 4/1991 | Hung | 361/57 |

*Primary Examiner*—Jeffery A. Hofsass
*Assistant Examiner*—Jacques M. Saint-Surin
*Attorney, Agent, or Firm*—Mason, Kolehmainen, Rathburn & Wyss

[57] ABSTRACT

A fiber to curb and telecommunications T1 carrier overvoltage protection apparatus includes a pair of semiconductor junction breakdown crowbar devices connected in series between TIP and RING telephone lines, and a reverse standoff voltage breakdown zener-type device connected between ground potential and a junction connection of the series connected semiconductor junction breakdown crowbar devices.

9 Claims, 1 Drawing Sheet

TELECOMMUNICATIONS T1 CARRIER OVERVOLTAGE AND FIBER TO CURB POWER PROTECTOR

BACKGROUND OF THE INVENTION

1. Field of the Invention

The present invention relates generally to telephone line protection devices, and more particularly to an improved telecommunications T1 carrier overvoltage protector and fiber to curb power protector.

2. Description of the Prior Art

Overvoltage protection devices are commonly used with telephone lines for protecting telephone equipment against hazardous power surges and transient voltages. Sources of transients include lightning, inductive switching electromagnetic interference (EMI), electrostatic discharge (ESD) and nuclear EMP (NEMP). Overvoltage protection circuitry that overcomes many disadvantages of the prior art circuitry is disclosed in McCartney, U.S. Pat. No. 4,758,920, issued Jul. 19, 1988 and McCartney et al., U.S. Pat. No. 4,941,063, issued Jul. 10, 1990 and both assigned to the assignee of the present invention.

A significant problem with known protection devices generally effective for overvoltage noise and transient protection is that, manual resetting is required with a typical holding current, such as greater than 260 milliamperes, present in the loop, because the typical overvoltage protector will remain in the low impedance mode, and as a result the overvoltage protector will be damaged or a fuse for the telephone system is blown.

SUMMARY OF THE INVENTION

A principal object of the present invention is to provide a telecommunications T1 carrier overvoltage protector and fiber to curb power protector that provides resettable operation.

In brief, the objects and advantages of the present invention are achieved by a fiber to curb and telecommunications T1 carrier overvoltage protection apparatus including a pair of semiconductor junction breakdown crowbar devices connected in series between TIP and RING telephone lines, and a reverse standoff voltage breakdown zener-type device connected between ground potential and a junction connection of the series connected semiconductor junction breakdown crowbar devices.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE PREFERRED EMBODIMENT

Figure 1:
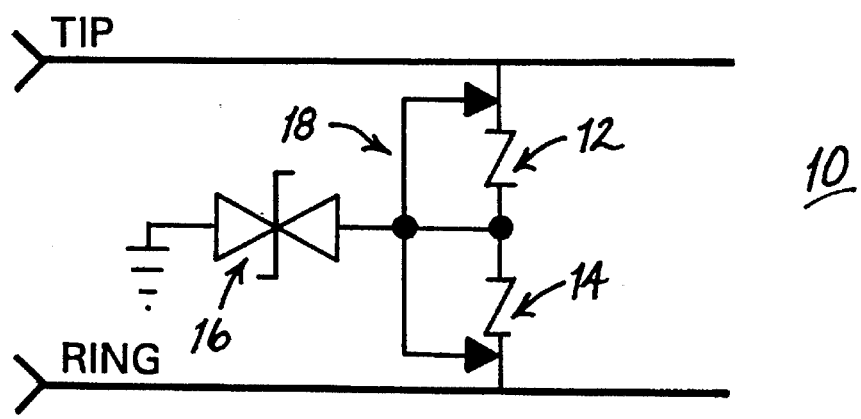
FIG. 1 is a schematic diagram representation of a telecommunications T1 carrier overvoltage protection apparatus and fiber to curb power protector constructed in accordance with the present invention.

Referring now to the drawings, in FIG. 1 there is illustrated a telecommunications fiber to curb and T1 carrier overvoltage protection apparatus designated as a whole by the reference character 10 and constructed in accordance with principles of the present invention. Having reference to FIG. 1, a telecommunications fiber to curb and T1 carrier overvoltage protection apparatus 10 includes a pair of solid state semiconductor junction breakdown or crowbar devices 12 and 14 connected between the TIP and RING INPUT connections. A reverse standoff voltage breakdown device or zener-type device 16 is connected between a ground potential and a junction connection of the crowbar devices 12 and 14. Protection apparatus 10 includes a fail-safe device 18. The telecommunications fiber to curb and T1 carrier overvoltage protection apparatus releases in less than 20 mS for a loop current of more than 260 mA after overvoltage clamping operation.

Each solid state crowbar device 12 and 14 is a low capacitance, bidirectional transient surge protector with a selected voltage clamping voltage for protecting from lightning, line transients and other high voltage spikes. The solid state crowbar devices 12 and 14 typically have a low maximum peak on-state voltage of 3 volts and an off-state capacitance in a range between 30 and 75 pF at 1 KHz and at 1 MHz with 50 VDC bias. The solid state crowbar devices 12 and 14 typically provide a response time of less than 2 microseconds. Various commercially available devices can be used for the solid state overvoltage devices 12 and 14, for example, such as, a balanced, triple sidactor part number P3403AB having a minimum breakover voltage rating of 300 volts and manufactured by Teccor Electronics, Inc. of Irving, Tex.

A transient voltage suppressor such as manufactured and sold by General Semiconductor Industries Inc., a Square D Company under a registered trademark TransZorb, or a metal oxide varistor (MOV) advantageously is used for the reverse standoff voltage breakdown, zener-type device 16. The reverse standoff voltage breakdown zener-type device 16 has a breakdown voltage and reverse standoff voltage without conduction selectively provided above the DC supply voltage on the TIP and RING lines for the fiber to curb or the T1 carrier application, such as above 50 volts or 135 volts. For example, by selecting a reverse standoff voltage rating of 150 volts for the reverse standoff voltage breakdown zener-type device 16, holding current problem is overcome because the telecommunications fiber to curb and T1 carrier overvoltage protection apparatus 10 resets when the transient drops below the selected reverse standoff voltage. The TransZorb device is preferred over a MOV for the zener-type device 16 due to its fail-safe or fails-shorted operation.

Fail-safe device 18 advantageously includes a fusible pellet and cooperating stamped metal member as disclosed in U.S. patent application Ser. No. 08/071,755 filed Jun. 9, 1993 by Jim Pelegris. The disclosure of the above-identified patent application is incorporated herein by reference.

Figure 2:
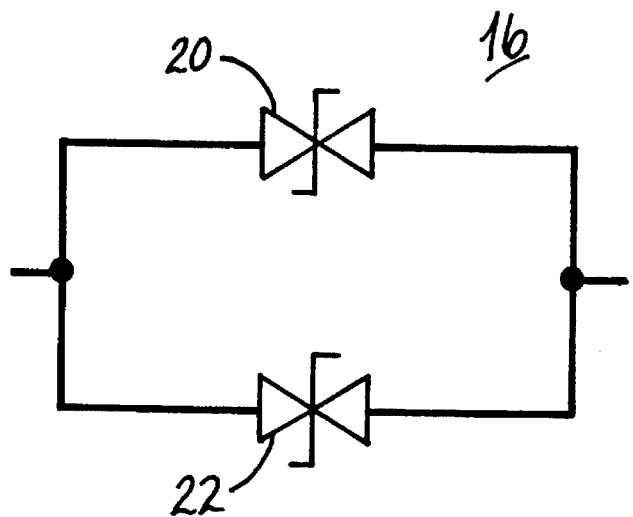
FIG. 2 is a schematic diagram representation of a parallel arrangement of a reverse standoff breakdown device of the telecommunications T1 carrier overvoltage protection apparatus and fiber to curb power protector of FIG. 1.

Referring to FIG. 2, a high-energy parallel arrangement of the reverse standoff voltage breakdown zener-type device 16 is shown including two transient voltage suppressors TransZorb or MOV devices 20 and 22.

Figure 3:
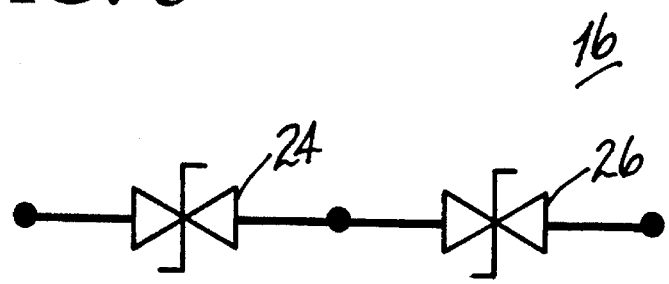
FIG. 3 is a schematic diagram representation of a series arrangement of a reverse standoff breakdown device of the telecommunications T1 carrier overvoltage protection apparatus and fiber to curb power protector of FIG. 1.

Referring to FIG. 3, there is shown a high-energy series arrangement of the reverse standoff voltage breakdown zener-type device 16 including two transient voltage suppressors TransZorb or MOV devices 24 and 26. In the series arrangement of devices 24 and 26, the selected reverse standoff voltage rating of the devices 24 and 26 can be ½ that of the parallel devices 20 and 22.

While the invention has been described with reference to details of the illustrated embodiment, these details are not intended to limit the scope of the invention as defined in the appended claims.

I claim:

1. A fiber to curb and telecommunications T1 carrier overvoltage protection apparatus comprising:

a pair of semiconductor junction breakdown crowbar devices connected in series between TIP and RING telephone lines;

a reverse standoff voltage breakdown zener-type device connected between a ground potential and a junction connection of said series connected semiconductor junction breakdown crowbar devices; said reverse standoff voltage breakdown zener-type device having a voltage breakdown rating above a power supply voltage on the TIP and RING telephone lines and said semiconductor junction breakdown crowbar devices being low capacitance, bidirectional devices, and a fail safe device coupled to said pair of semiconductor junction breakdown crowbar devices.

2. A fiber to curb and telecommunications T1 carrier overvoltage protection apparatus as recited in claim 1 wherein each of said pair of semiconductor junction breakdown crowbar devices has a low maximum peak on-state voltage of less than 6 volts.

3. A fiber to curb and telecommunications T1 carrier overvoltage protection apparatus as recited in claim 1 wherein each of said pair of semiconductor junction breakdown crowbar devices has a response time of less than 2 microseconds.

4. A fiber to curb and telecommunications T1 carrier overvoltage protection apparatus as recited in claim 1 wherein said reverse standoff voltage breakdown zener-type device is a transient voltage suppressor device that fails shorted.

5. A fiber to curb and telecommunications T1 carrier overvoltage protection apparatus as recited in claim 1 wherein said reverse standoff voltage breakdown zener-type device is a metal oxide varistor.

6. A fiber to curb and telecommunications T1 carrier overvoltage protection apparatus as recited in claim 1 wherein said voltage breakdown rating is above 50 volts.

7. A fiber to curb and telecommunications T1 carrier overvoltage protection apparatus as recited in claim 1 wherein said voltage breakdown rating is above 135 volts.

8. A fiber to curb and telecommunications T1 carrier overvoltage protection apparatus as recited in claim 1 wherein said reverse standoff voltage breakdown zener-type device includes a pair of reverse standoff voltage breakdown zener-type devices connected in parallel.

9. A fiber to curb and telecommunications T1 carrier overvoltage protection apparatus as recited in claim 1 wherein said reverse standoff voltage breakdown zener-type device includes a pair of reverse standoff voltage breakdown zener-type devices connected in series.

* * * * *